United States Patent
Childs et al.

(10) Patent No.: US 8,680,707 B2
(45) Date of Patent: Mar. 25, 2014

(54) POWER DISTRIBUTION SYSTEMS

(75) Inventors: Jonathan Childs, Warwickshire (GB); Allan David Crane, Gwynedd (GB)

(73) Assignee: GE Energy Power Conversion Technology Limited, Rugby, Warwickshire (BA)

( * ) Notice: Subject to any disclaimer, the term of this patent is extended or adjusted under 35 U.S.C. 154(b) by 670 days.

(21) Appl. No.: 12/902,180

(22) Filed: Oct. 12, 2010

(65) Prior Publication Data

US 2011/0084670 A1    Apr. 14, 2011

(30) Foreign Application Priority Data

Oct. 13, 2009 (EP) .................................... 09012905

(51) Int. Cl.
*B60L 1/00* (2006.01)
*B60L 3/00* (2006.01)
*H02G 3/00* (2006.01)

(52) U.S. Cl.
USPC .......................................................... 307/9.1

(58) Field of Classification Search
USPC .................. 307/9.1; 322/90; 290/4 R, 9
See application file for complete search history.

(56) References Cited

U.S. PATENT DOCUMENTS

| 6,175,163 | B1 * | 1/2001 | Rinaldi et al. | 290/6 |
| 6,333,622 | B1 | 12/2001 | Fogarty et al. | |
| 2008/0103632 | A1 * | 5/2008 | Saban et al. | 700/286 |

FOREIGN PATENT DOCUMENTS

| CN | 1116370 | | 2/1996 |
| DE | 102007054228 | A1 | 5/2009 |
| EP | 1029783 | A2 | 8/2000 |
| EP | 2157687 | A1 | 2/2010 |
| GB | 2445382 | | 9/2008 |
| WO | 2010022389 | A1 | 2/2010 |

* cited by examiner

*Primary Examiner* — Carlos Amaya
(74) *Attorney, Agent, or Firm* — Parks IP Law LLC; Theodore A. Wood

(57) ABSTRACT

The present invention relates to power distribution systems (e.g. a marine power distribution and propulsion system) that include first and second ac distribution busbars. The first ac distribution busbar will typically be a medium voltage busbar for the propulsion drive systems and the second ac distribution busbar will typically be a low voltage for ships services. A 12-pulse rectifier has its ac terminals electrically connected to the first ac distribution busbar. A multiple output generator has first and second galvanically-isolated stator windings. The first stator winding provides a six-phase ac output and is connected to the first ac distribution busbar. The second stator winding provides a three-phase ac output and is connected to the second ac distribution busbar. The six-phase ac output is phase shifted relative to the three-phase ac output to reduce the problematic coupling of harmonic distortion between the first and second ac distribution busbars.

15 Claims, 6 Drawing Sheets

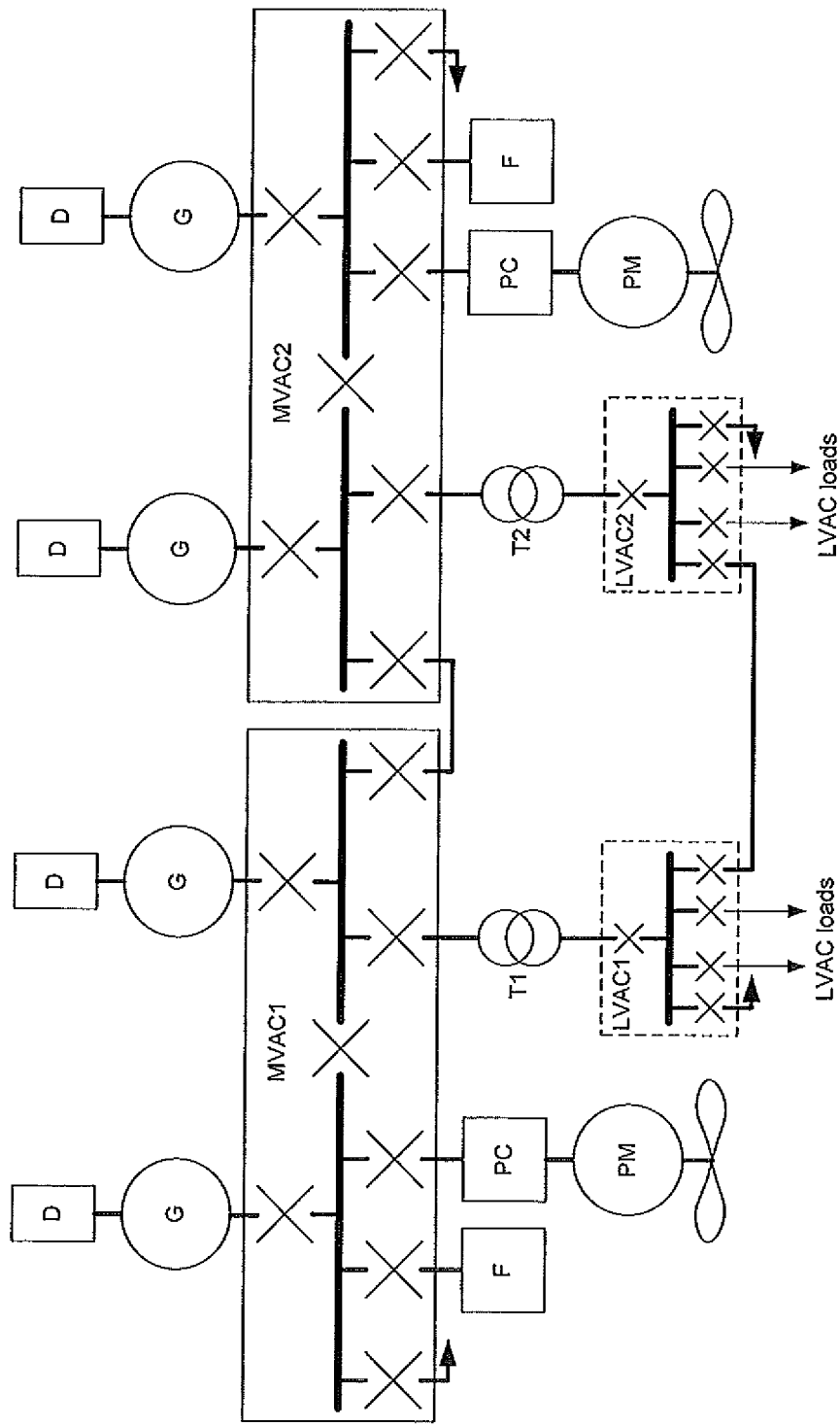
Figure 1
CONVENTIONAL

POWER DISTRIBUTION SYSTEMS

CROSS REFERENCE TO RELATED APPLICATION

This application claims priority to European Patent Application No. 09012905.7 filed Oct. 13, 2009.

FIELD OF THE INVENTION

The present invention relates to power distribution systems, and in particular to power distribution systems that can be used onboard marine vessels for supplying power to one or more propulsion motors, in addition to ships services.

BACKGROUND OF THE INVENTION

An example of a conventional marine power distribution and propulsion system is shown in FIG. 1. A series of diesel engines D are used to drive individual ac generators G. These supply ac power to a first medium voltage switchboard or busbar MVAC1 and a second medium voltage switchboard or busbar MVAC2. The medium voltage busbars are equipped with protective switchgear that comprise circuit breakers and associated controls and are represented in FIG. 1 by the x symbol. Power converters PC are used to interface the medium voltage busbars to electric propulsion motors PM that drive propellers. The medium voltage busbars are interconnected by protective switchgear.

Most of the ships services require low voltage and it is convenient to derive this from the medium voltage busbars by using a transformer. In the conventional marine power distribution and propulsion system shown in FIG. 1, a first low voltage switchboard or busbar LVAC1 is connected to the first medium voltage busbar MVAC1 through a first transformer T1 and protective switchgear. A second low voltage switchboard or busbar LVAC2 is connected to the second medium voltage busbar MVAC2 through a second transformer T2 and protective switchgear. The low voltage busbars are interconnected by protective switchgear. A series of unspecified electrical loads (labelled LVAC loads) can be connected to the low voltage busbars.

Although it is convenient to connect the low voltage busbars to the medium voltage busbars, such an arrangement normally leads to problematic coupling of harmonic distortion. In other words, harmonic distortion in the medium voltage busbars caused by the operation of the propulsion motors, for example, will be transferred through the transformers T1 and T2 to the low voltage busbars. If the electrical loads connected to the low voltage busbars require low harmonic distortion (i.e. a high quality of power supply (QPS)) then this may cause potential problems with their normal operation. Also, some of the loads connected to the low voltage busbars may themselves cause harmonic distortion in the low voltage busbars. This will be transferred through the transformers T1 and T2 to the medium voltage busbars.

In order to suppress such harmonic distortion, large and costly filters F are normally connected to the medium voltage busbars.

Another option for suppressing the harmonic distortion is to use phase-shifting transformers in place of the transformers T1 and T2.

In other marine power distribution and propulsion systems then a low voltage ac supply is employed and in this case the arrangement shown in FIG. 1 is still applicable but the first and second medium voltage busbars MVAC1 and MVAC2 simply operate at low voltage. This might be the case where the power rating of the propulsion motors PM is insufficient to warrant the use of a medium voltage ac supply. It is common for the propulsion motors PM to be supplied with a different value of low voltage than the low voltage supply that is provided to the LVAC loads. For example, propulsion loads may have a 690 V supply whereas ships service loads may have a 440 V supply.

In such low voltage systems it is common for larger auxiliary electrical loads such as thrusters, pumps and cranes, for example, to be fed by the same supply voltage and the propulsion motors. Although only propulsion loads are shown as being connected to the first and second medium voltage busbars MVAC1 and MVAC2, it will be readily appreciated that other electrical loads may also be connected to them.

Moreover, in some cases the propulsion converters PC that are used to interface the propulsion motors PM to the first and second medium voltage busbars MVAC1 and MVAC2, together with any other larger auxiliary electrical loads, may, at a cost and size penalty, incorporate additional technical features that minimise harmonic distortion in those busbars. The use of such additional technical features would eliminate the requirement for the filters F. Whichever approach is used to minimise harmonic distortion there is always a significant size and cost penalty to ensure that the QPS is maintained on the first and second medium voltage busbars MVAC1 and MVAC2 such that a satisfactory QPS is similarly maintained on the low voltage busbars LVAC1 and LVAC2.

SUMMARY OF THE INVENTION

The present invention seeks to address the problematic coupling of harmonic distortion mentioned above and provides a power distribution system comprising: a first distribution busbar; a second distribution busbar; a multi-pulse rectifier having terminals electrically connected to the first distribution busbar; and a multiple output generator having first and second galvanically-isolated stator windings, the first stator winding providing a first multi-phase ac output with n phases and being connected to the first distribution busbar (optionally by means of the multi-pulse rectifier in the case where the first distribution busbar carries a dc distribution voltage) to supply a first distribution voltage to the first distribution busbar and the second stator winding providing a second multi-phase ac output with m phases and being connected to the second distribution busbar to supply a second distribution voltage to the second distribution busbar; wherein the n phases of the first ac output are phase shifted relative to the m phases of the second ac output.

Phase shifting the first ac output relative to the second ac output results in a reduction in harmonic distortion for the reasons explained in more detail below. In practice, the second ac output functions as a reference output and the phases of the first ac output are phase shifted relative to it.

The first stator winding is preferably divided into two or more subsidiary stator windings, each stator winding providing a proportion of the n phases of the first ac output.

The subsidiary stator windings are preferably galvanically isolated from each other and from the second stator winding.

The first and second stator windings each include a plurality of coils connected together and are multi-phase (or polyphase) stator windings. The line current groups for the multiple output generator will operate at different voltages and harmonic distortion phase relationships. The line current groups may also operate at different power factors.

The n phases of the first ac output are preferably substantially symmetrically phase shifted relative to the m phases of the second ac output. Typically, a first proportion of the n phases of the first ac output is phase shifted by a predetermined positive angle relative to the m phases of the second ac output and a second proportion of the n phases of the first ac output is phase shifted by a predetermined negative angle relative to the m phases of the second ac output. The predetermined positive angle and the predetermined negative angle preferably have substantially the same magnitude.

In a first possible arrangement the first ac output is a six-phase ac output and the second ac output is a three-phase ac output. Three phases of the first ac output are phase shifted by a predetermined positive angle relative to the second ac output and three phases of the first ac output are phase shifted by a predetermined negative angle relative to the second ac output. The predetermined positive angle is about +15 degrees and the predetermined negative angle is about −15 degrees. The multi-pulse rectifier is a 12-pulse rectifier.

In a second possible arrangement the first ac output is a twelve-phase ac output and the second ac output is a three-phase ac output. Three phases of the first ac output are phase shifted by a first predetermined positive angle relative to the second ac output, three phases of the first output are phase shifted by a second predetermined positive angle relative of the second ac output, three phases of the first ac output are phase shifted by a first predetermined negative angle relative to the second ac output, and three phases of the first ac output are phase shifted by a second predetermined negative angle relative to the second ac output. The first predetermined positive angle is about +22.5 degrees, the second predetermined positive angle is about +7.5 degrees, the first predetermined negative angle is about −7.5 degrees, and the second predetermined negative angle is about −22.5 degrees. The multi-pulse rectifier is a 24-pulse rectifier.

A capacitor bank can be connected to the second ac output to provide a further reduction in harmonic distortion and to influence the excitation of the multiple output generator. In the first possible arrangement harmonic currents of order greater than 7 do not benefit from phase cancellation within the generator and harmonics of order lower than 8 may have imperfect phase cancellation. In the second possible arrangement harmonic currents of order greater than 13 do not benefit from phase cancellation within the generator and harmonics of order lower than 14 may have imperfect phase cancellation. Thus, the second ac output of the generator will contain voltage harmonic distortion. The action of the capacitor bank, in conjunction with the reactive and resistive impedance of the electrical machine, is comparable to that of a damped second-order lag LC filter, but the practical nature of the electrical machine is such that the filtration deviates from the ideal characteristic. Nevertheless, the action of the capacitor bank provides beneficial harmonic filtration. By drawing a fundamental component of current at a leading power factor, the capacitor bank also provides excitation of the generator. The fundamental MVAR rating of the capacitor bank must not be excessive from a conventional stability perspective and the capacitor bank must include provision for inrush current limitation.

The first distribution busbar (MVAC1) can carry an ac distribution voltage that is provided by the first stator winding of the multiple output generator.

The second distribution busbar (LVAC1) can also carry an ac distribution voltage that is provided by the second stator winding of the multiple output generator.

The first ac distribution busbar will normally function as a medium voltage (MV) or low voltage (LV) busbar and the second ac distribution busbar will normally function as a low voltage busbar. Thus, in the case where the power distribution system is a marine power distribution and propulsion system, the ac power generated by the multiple output generator may be distributed at medium or low voltage (e.g. 6.6 kV or 690 V) to one or more propulsion drive systems through the first ac distribution busbar and at low voltage (e.g. 440 V) to ships services through the second ac distribution busbar.

The multi-pulse rectifier can be electrically connected between the first distribution busbar and a propulsion motor. In other words, the multi-phase rectifier may form part of a power converter that also includes a dc link and an inverter that is electrically connected to the ac terminals of an ac propulsion motor. If a dc propulsion motor is used then its dc terminals may in some cases be connected directly to the dc terminals of the multi-pulse rectifier and in other cases may be connected to the dc terminals of the multi-pulse rectifier by means of an interposing dc/dc power converter.

The first distribution busbar may carry a dc distribution voltage. In this arrangement the multi-pulse rectifier is electrically connected between the first stator winding of the multiple output generator and the first distribution busbar to rectify the first ac output. In other words, the dc distribution voltage that is carried by the first distribution busbar is derived directly from the first ac output of the generator by the rectifier action of the multi-pulse rectifier.

The power distribution system can include additional distribution busbars. Distribution busbars carrying the same distribution voltage may be interconnected together by protective switchgear. All components (e.g. multiple output generators, power converters and low voltage loads) may be connected to the distribution busbars by protective switchgear that comprise circuit breakers and associated controls.

Each distribution busbar may receive power from additional multiple output generators. For example, in a possible arrangement the power distribution system may include two or more multiple output generators whose first ac outputs are provided to the first distribution busbar (optionally after being rectified by the multi-pulse rectifier in the case where the first distribution busbar carries a dc distribution voltage) and whose second ac outputs are provided to the second distribution busbar. Any practical power distribution system may operate with various numbers of power distribution "islands", but sharing of parallel connected multiple output generators and transitions between operating modes must be carefully controlled. Islands may be connected together in parallel to give a single island arrangement (e.g. for single propulsion motor running) or may be separated to provide redundancy and graceful degradation of capability following equipment failures. Each multiple output generator is preferably regulated by a conventional Automatic Voltage Regulator (AVR) according to a suitable analogue or digital control method or algorithm.

A propulsion motor can be connected to the multi-pulse rectifier using an appropriate interposing power converter and can be of any suitable type (induction, synchronous etc.) However, it will be readily appreciated that other electrical loads can also be connected to the multi-pulse rectifier as required.

The multi-pulse rectifier may be a conventional industrial or marine type. The exact form of the component that is employed will influence the operational behaviour and capability of the power distribution system, particularly during equipment failures. The multi-pulse rectifier may have either the standard series or parallel configuration and employ diodes or thyristors, for example. If thyristors are used then they will normally be operated with the minimum practical firing delay angle but they can also be phase controlled to provide protective or other regulatory features. Whichever configuration and semiconductor power devices are employed then, in the case where the first distribution busbar carries an ac distribution voltage, it is essential that the multi-pulse rectifier control system, rectifier commutation design and dc link filtration take into account the requirement for phase balance in all of the ac lines of the first distribution busbar. For example, when the standard series configuration is used then a dc bias voltage is experienced between the individual phase groups of the first stator winding.

The multi-pulse rectifier may be used in combination with any convenient voltage source inverter types such as IGBT-based two-level pulse width modulated (PWM) and three-level PWM types, for example. Subject to the requirement for phase balance in the ac lines of the first distribution busbar, the multi-pulse rectifier may also be used in combination with other well known current source inverter dc link frequency converters. The inverter may form part of a power converter that includes the multi-pulse rectifier or be located between the first distribution busbar and a propulsion motor in the case where the first distribution busbar carries a dc distribution voltage, for example.

Two or more multi-pulse rectifiers can be connected to the first distribution busbar as required.

Other multi-phase variable speed drives, fixed speed drives and non-drive type electrical loads may be connected to the first distribution busbar. In the case where the first distribution busbar carries an ac distribution voltage then it is essential that their multi-pulse rectifiers are compliant with the requirement for phase balance in the ac lines of the first distribution busbar.

Non-converter based multi-phase electrical loads may also be connected to the first distribution busbar. In the case where the first distribution busbar carries an ac distribution voltage then it is essential that the multi-phase loads are compliant with the requirement for phase balance in the ac lines of the first distribution busbar. Additionally, when series connected multi-pulse rectifiers draw power from the first distribution busbar it is essential that such non-converter based multi-phase loads are compliant with the requirements to withstand the dc bias voltage that is experienced between the individual phase groups of the first stator winding.

BRIEF DESCRIPTION OF THE DRAWINGS

Exemplary embodiments of the invention will now be described, with reference to the accompanying drawings, in which:

FIG. 1 is a schematic diagram of a conventional marine power distribution and propulsion system;

DETAILED DESCRIPTION OF THE PREFERRED EMBODIMENTS

Although the following description is directed to a power distribution systems for marine applications, and in particular to power distribution and propulsion systems that are highly suitable for commercial vessels, naval ships and submarines, it will be readily understood that a similar topology and control method can be used in other sorts of power distribution systems such as land-based or aircraft-based systems, for example.

Figure 2:
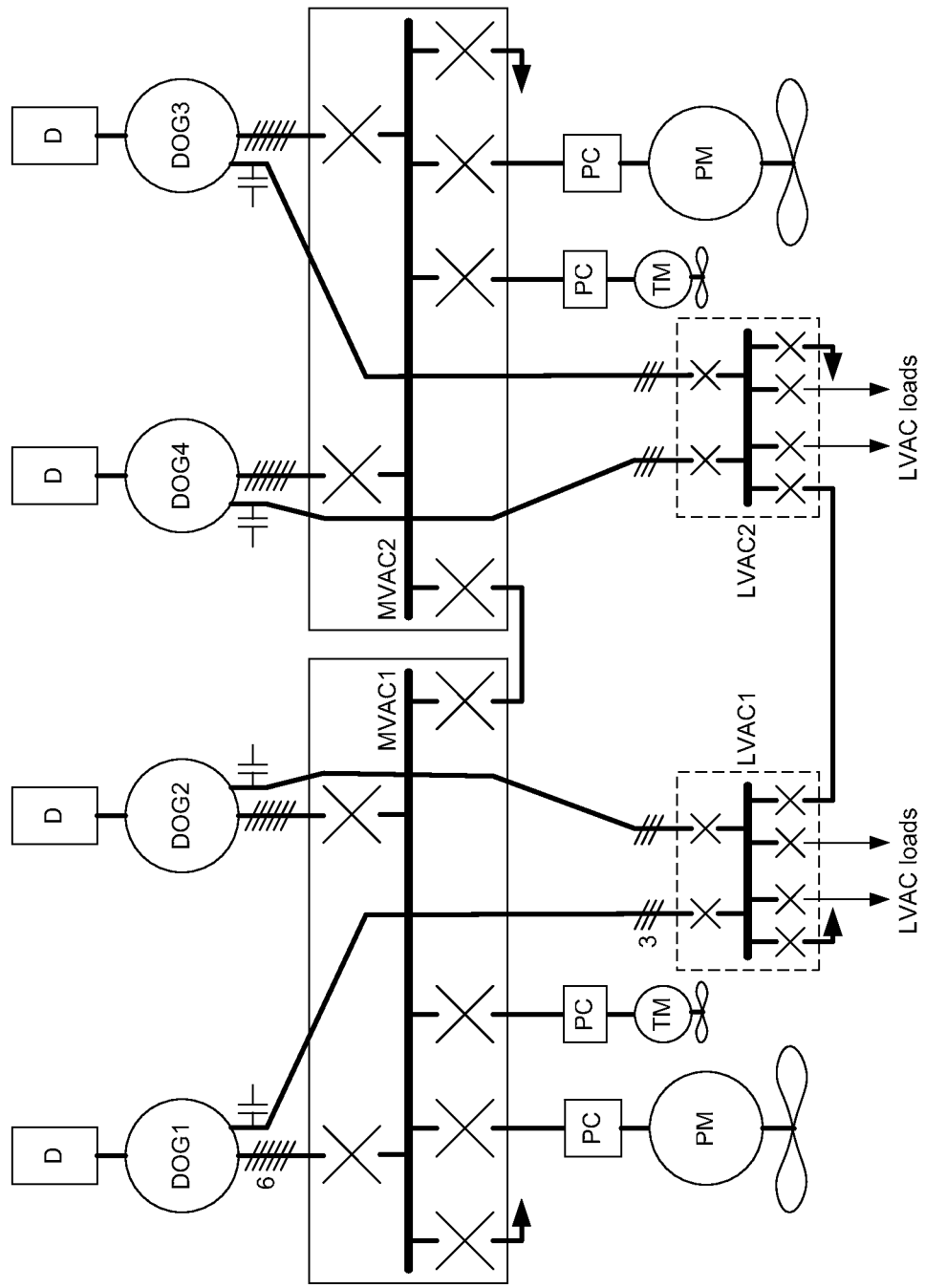
FIG. 2 is a schematic diagram of a marine power distribution and propulsion system in accordance with a first embodiment of the present invention.

FIG. 2 shows a first marine power distribution and propulsion system in accordance with the present invention. The system uses double output ac generators (DOGs) that have two galvanically-isolated multi-phase stator windings, each stator winding being connected to an independent load.

A main diesel double output ac generator DOG1 and an auxiliary diesel double output ac generator DOG2 each supply ac power to a first medium voltage switchboard or busbar MVAC1 from one of their multi-phase stator windings and supply ac power to a first low voltage switchboard or busbar LVAC1 from the other of their multi-phase stator windings. In a similar manner, a main diesel double output ac generator DOG3 and an auxiliary diesel double output ac generator DOG4 both supply ac power to a second medium voltage switchboard or busbar MVAC2 from one of their multi-phase stator windings and supply ac power to a second low voltage switchboard or busbar LVAC2 from the other of their multi-phase stator windings. It will be readily appreciated that each stator winding of each double output generator provides a different ac output voltage (e.g. 6.6 kV and 440 V or, in the case where the medium voltage busbars carry a low voltage, 690 V and 440 V).

The requirement for a transformer between the medium and low voltage busbars is eliminated, thereby improving efficiency of the overall marine power distribution and propulsion system while at the same time reducing noise, vibration, machinery volume and mass.

The medium voltage busbars carry a medium voltage (MV) ac distribution voltage (e.g. 6.6 kV, 60 Hz) and are equipped with protective switchgear. The protective switchgear comprise circuit breakers and associated controls and are represented in FIG. 2 by the x symbol. The medium voltage busbars MVAC1 and MVAC2 are interconnected by protective switchgear. It will be readily appreciated that the medium voltage busbars MVAC1 and MVAC2 may carry any convenient voltage (including a low voltage e.g. 690 V, 60 Hz) and that such arrangements would be within the scope of the present invention.

The main and auxiliary diesel double output ac generators DOG1, DOG2 are connected to the first medium voltage busbar MVAC1 by protective switchgear. In a similar manner, the main and auxiliary diesel double output ac generators DOG3, DOG4 are connected to the second medium voltage busbar MVAC2 by protective switchgear. Although not shown, the medium voltage busbars can be divided into two or more separate sections that are interconnected by protective switchgear. The separate sections of each medium voltage busbar, and the first and second medium voltage busbars themselves, may therefore be selectively isolated from each other under certain operating conditions. Single and multiple island operation of the marine power distribution and propulsion system is therefore possible using an appropriate number of double (or multiple) output ac generators, medium voltage busbars and busbar sections.

First and second propulsion drive systems each include a power converter PC that is used to interface the medium voltage busbars MVAC1 and MVAC2 to an ac propulsion motor PM that drives a propeller. The marine power distribution and propulsion system also includes first and second thruster drive systems. Each thruster drive system includes a power converter PC that is used to interface the medium voltage busbars MVAC1 and MVAC2 to an ac thruster motor TM that drives a propeller. Each power converter PC shown in FIG. 2 includes a 12-pulse rectifier, dc link and an inverter. However, in an alternative arrangement where the first and second propulsion drive systems include dc propulsion motors or thruster motors then each power converter PC will only include a 12-pulse rectifier.

The main and auxiliary diesel double output ac generators DOG1, DOG2 are connected to the first low voltage busbar LVAC1 by protective switchgear. In a similar manner, the main and auxiliary diesel double output ac generators DOG3, DOG4 are connected to the second low voltage busbar LVAC2 by protective switchgear. The low voltage busbars LVAC1 and LVAC2 are interconnected by protective switchgear.

The low voltage busbars LVAC1 and LVAC2 carry a low voltage (LV) ac distribution voltage (e.g. 440 V, 60 Hz) and a number of unspecified loads such as ships service distribution systems (labelled LVAC loads) are connected to the low voltage busbars by protective switchgear.

The technical features of one of the double output ac generators (DOGs) will now be described in more detail with reference to FIG. 3. The DOG has a rotor (not shown) that is driven by a prime mover such as a diesel engine, for example. A first stator winding includes a plurality of coils (not shown) connected together and defines a first ac output having six phases. A six-phase stator winding has all six phases wound in a manner that gives them a specific operational relationship and this is true even though the first stator winding is divided into or incorporates two subsidiary stator windings that are galvanically isolated from each other. A first subsidiary stator winding provides three phases of the first ac output and a second subsidiary stator winding provides three phases of the first ac output. The first and second subsidiary stator windings will typically have balanced reactances and must operate with loads that have balanced fundamental currents, harmonic currents and fundamental power factors for the process of phase cancellation to be perfectly effective. The first stator winding should therefore be specifically designed and constructed to comply with these operational requirements.

A second stator winding includes a plurality of coils (not shown) connected together and defines a second ac output having three phases. The first and second stator windings are galvanically isolated from each other. More particularly, the second stator winding is galvanically isolated from the first and second subsidiary stator windings that together form the first stator winding.

Although the basic principles of harmonic phase cancellation and phase shifting are well known, the specific phase shifting that is used within the present invention requires further detailed explanation as follows. As shown in FIG. 3, the two three-phase groups of the first ac output are phase shifted symmetrically about the second three-phase ac output. More particularly, three phases of the first ac output that are provided by the first subsidiary stator winding are shifted by +15 degrees relative to the respective three phases of the second ac output and the other three phases of the first ac output that are provided by the second subsidiary stator winding are shifted by −15 degrees relative to the respective three phases of the second ac output.

The phase shift angles are applied with respect to the fundamental components of stator voltages and are specifically selected to cause the 5th and 7th harmonic voltages (i.e. the harmonic orders 5 and 7) of the first three-phase group of the first ac output to be in anti-phase with the respective 5th and 7th harmonic voltages of the second three-phase group of the first ac output. There is a 30 degree relative phase shift between these fundamental voltages, a corresponding 30 degree "plus" 5×30=180 degree phase shift between the 5th harmonic voltages and a corresponding 30 degree "minus" 7×30=−180 degree phase shift between the 7th harmonic voltages; "plus" and "minus" 30 degree terms being associated with the negative sequence or the 5th harmonic voltage and the positive sequence of the 7th harmonic voltage, respectively. Since the harmonic voltages are in anti-phase, all harmonic currents that originate in the 12-pulse load circulate between the two three-phase groups of the first ac output without coupling into the rotor winding of the DOGs to a significant degree. By being placed symmetrically between the two three-phase groups of the first ac output, and as a result of their lack of coupling into the rotors, the second ac output is not coupled to the first ac output at the 5th and 7th harmonic voltages.

Figure 4:
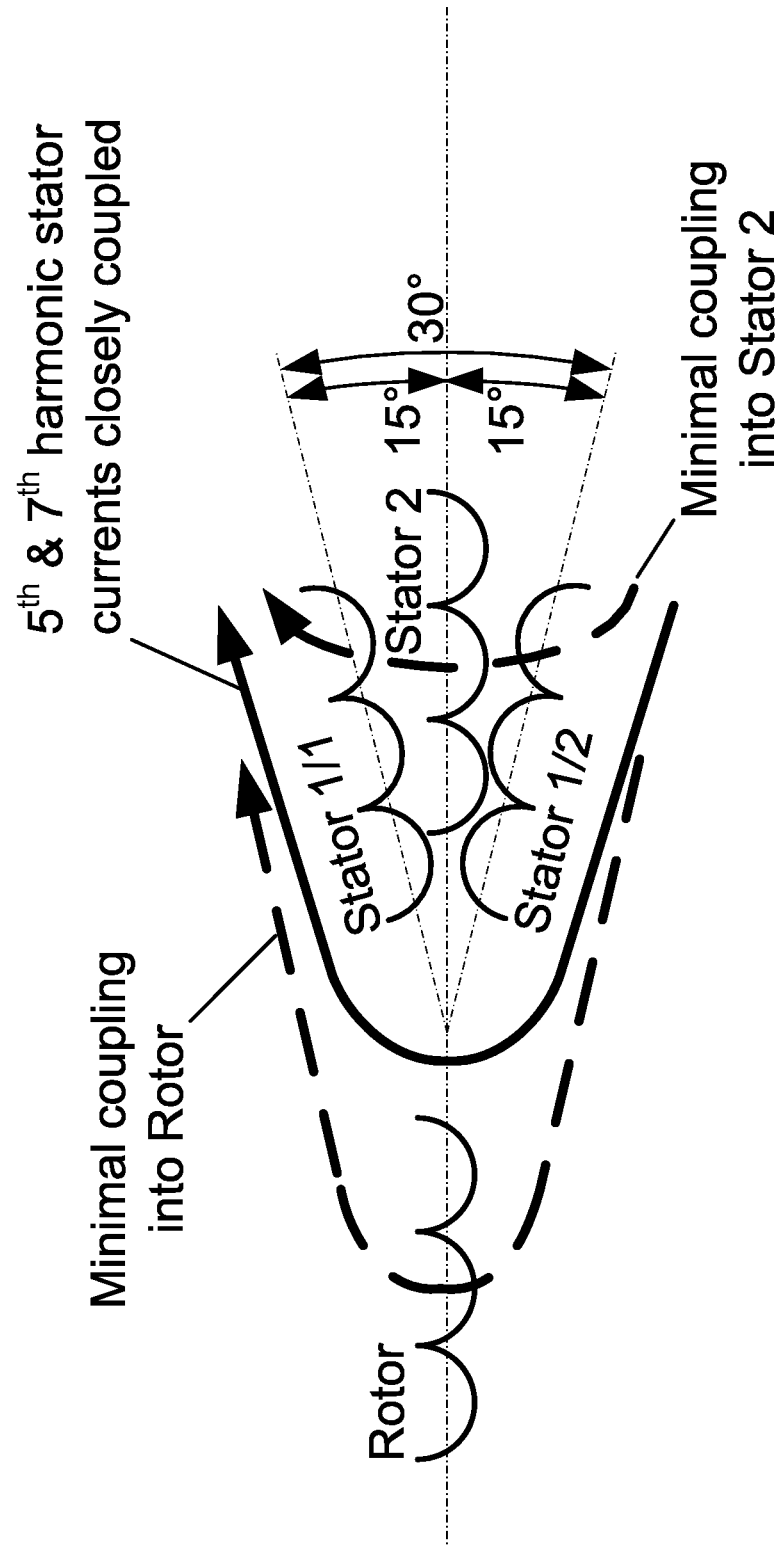
FIG. 4 is a schematic diagram showing harmonic phase cancellation.

Phase cancellation and coupling can be further explained with reference to FIG. 4 in which the first subsidiary stator winding that provides the first three phases of the first ac output is labelled as Stator 1/1 and the second subsidiary stator winding that provides the second three phases of the first ac output is labelled as Stator 1/2. The second stator winding that provides the second ac output is labelled as Stator 2. As described above, the 5th and 7th harmonic voltages circulate in anti-phase between the first and second subsidiary stator windings Stator 1/1 and Stator 1/2. The first and second subsidiary stator windings Stator 1/1 and Stator 1/2 are inherently well coupled because together they define the first stator winding. Consequently, there is minimal leakage of the 5th and 7th harmonic voltages into both the rotor winding and the second stator winding Stator 2 that provides the second ac output. The simplified single phase form has been used in FIG. 4 for reasons of clarity. However, in practice it will be readily appreciated that the first and second subsidiary stator windings Stator 1/1 and Stator 1/2, the second stator winding Stator 2 and the rotor winding will each have three respective phases and the phase relationships for the respective first phases that are shown in FIG. 4 will also be maintained between the respective second and third phases. The angles shown in FIG. 4 are applicable to the stator fundamental frequency and the skilled person will understand that the equivalent physical angles will be dependant upon the number of rotor poles.

The first ac output is connected to a six-phase medium voltage busbar that can be the first or second medium voltage busbar MVAC1, MVAC2 shown in FIG. 2. More particularly, the medium voltage busbar includes a first ac busbar AC1 carrying the three phases of the first ac output that are provided by the first subsidiary stator winding and a second ac busbar AC2 carrying the three phases of the first ac output that are provided by the second subsidiary stator winding. In FIG. 3 the medium voltage busbar is labelled as a MVAC propulsion bus because it is intended to be used to supply power to propulsion drive systems. Two 12-pulse rectifiers are connected to the medium voltage busbar by means of protective switchgear. A first ac input terminal of each 12-pulse rectifier is connected to the first ac busbar AC1 and a second ac input terminal of each 12-pulse rectifier is connected to the second ac busbar AC2.

The 12-pulse rectifiers form part of the propulsion and thruster drive systems. More particularly, the 12-pulse rectifiers are an integral part of the power converters PC shown in FIG. 2. The dc terminals of each 12-pulse rectifier are connected to the associated ac propulsion motor PM and ac thruster motor TM by means of a dc link and a 12-pulse inverter (not shown).

Figure 3:
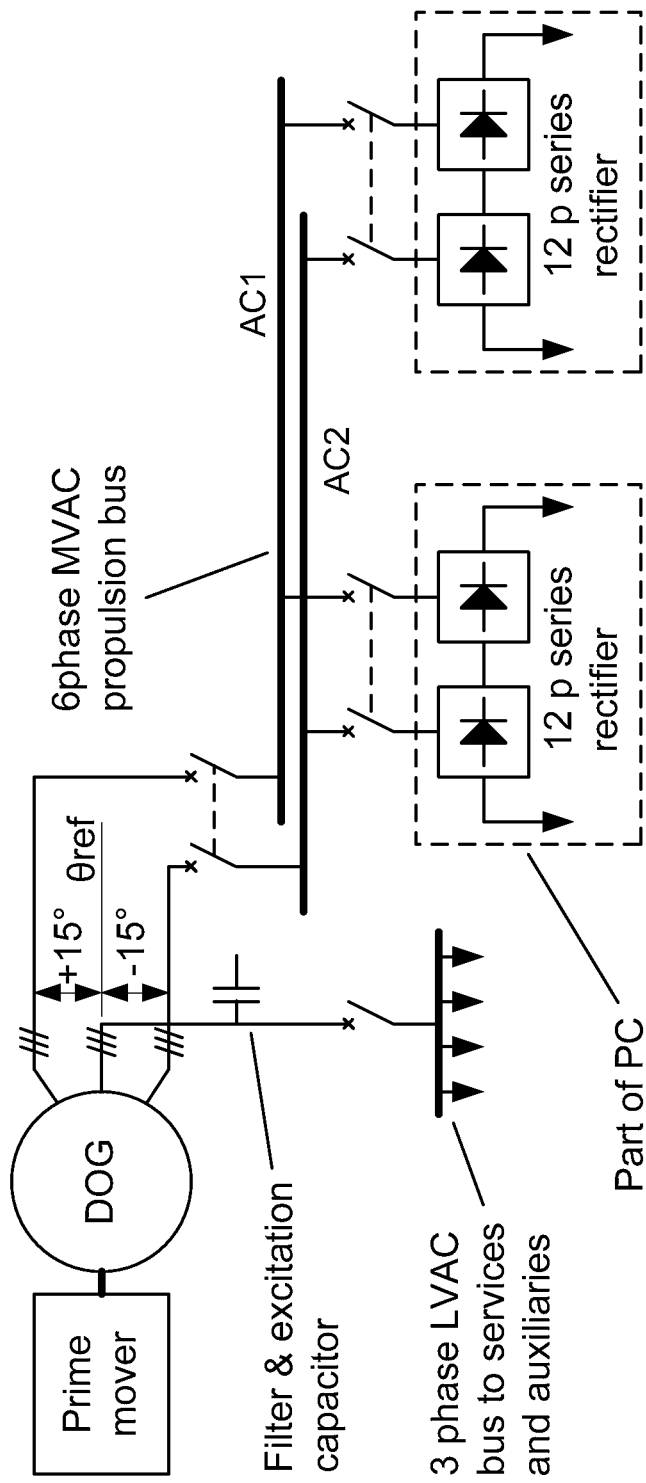
FIG. 3 is a detail schematic diagram of a double output generator (DOG) having a six-phase ac output and a three-phase ac output.

FIG. 3 shows a 12-pulse series connection but it will be readily appreciated that a parallel connection can also be used.

The 5th and 7th harmonic voltages that are drawn by the 12-pulse rectifiers circulate through the DOG according to the well known phase shifting principle that is described above and this means that the rotor of the DOG does not experience, to any significant or problematic degree, the adverse and problematic effects of the 6th harmonic voltage that are associated with three-phase 6-pulse rectifier systems. Higher order harmonic components do not benefit from phase cancellation and the rotor of the DOG will therefore experience the effects of the 12th, 18th, 24th . . . harmonic voltages, but these are not considered to be particular problematic.

The second ac output is connected to a three-phase low voltage busbar that can be the first or second low voltage busbar LVAC1, LVAC2 shown in FIG. 2. Although the second ac output will contain minimal 5th and 7th harmonic voltage as a result of the phase shift, 11th, 13th, 17th, 19th, 23rd . . . harmonic voltages are present since they are also present in the rectifier line currents. These harmonic components may be moderated by employing diode bridge rectifiers and by increasing the six-phase commutating reactance of the DOG. If further attenuation is required then a capacitor bank may be connected to the second ac output in order to provide a low pass filter response in combination with the six-phase to three-phase leakage reactance of the DOG, thereby providing the desired attenuation of higher order harmonic components. Such a capacitor bank is shown in FIGS. 2 and 3 and would provide beneficial stator excitation.

Figure 5:
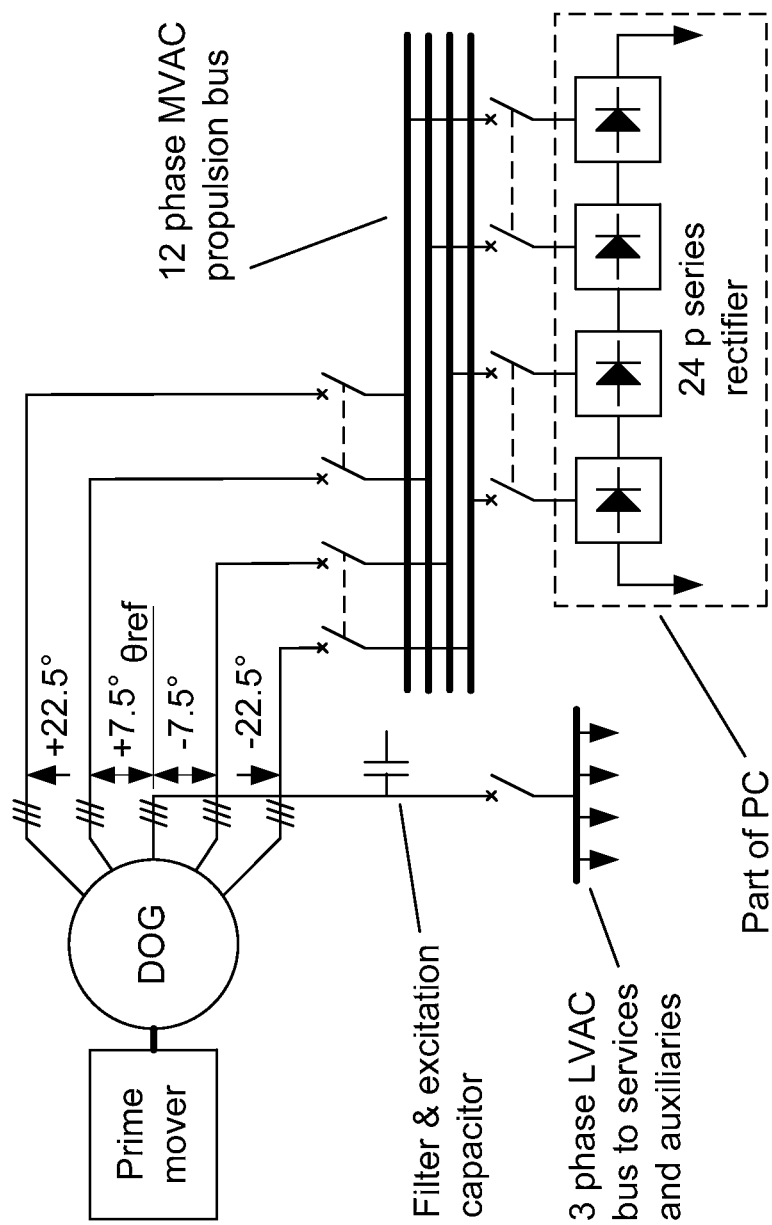
FIG. 5 is a detail schematic diagram of a DOG having a twelve-phase ac output and a three-phase ac output.

FIG. 5 shows the phase cancellation for an alternative arrangement where the first stator winding of each DOGs defines a first ac output having twelve phases. The first stator winding is divided into four subsidiary stator windings, each one providing three phases of the first ac output. The four subsidiary stator windings are galvanically isolated from each other. The second stator winding defines a second ac output having three phases. The first and second stator windings are galvanically isolated from each other. More particularly, the second stator winding is galvanically isolated from the four subsidiary stator windings that together form the first stator winding.

The four three-phase groups of the first ac output are phase shifted symmetrically about the second three-phase ac output. More particularly, three phases of the first ac output that are provided by the first subsidiary stator winding are shifted by +25.5 degrees relative to the respective three phases of the second ac output, the three phases of the first ac output that are provided by the second subsidiary stator winding are shifted by +7.5 degrees relative to the respective three phases of the second ac output, the three phases of the first ac output that are provided by the third subsidiary stator winding are shifted by −7.5 degrees relative to the respective three phases of the second ac output, and the three phases of the first ac output that are provided by the fourth subsidiary stator winding are shifted by −22.5 degrees relative to the respective three phases of the second ac output.

The present invention can be symmetrically extended to any convenient number of phases for the first ac output within the series 3Ne where Ne is an even integer and where harmonic orders in the series 5, 7, 11, 13 up to 6Ne±1 benefit from phase cancellation. However, it will generally be impractical to distribute ac power with an excessive number of phases because this would impose a requirement for an unreasonably large number of ac busbars and switch contacts within the distribution system.

Figure 6:
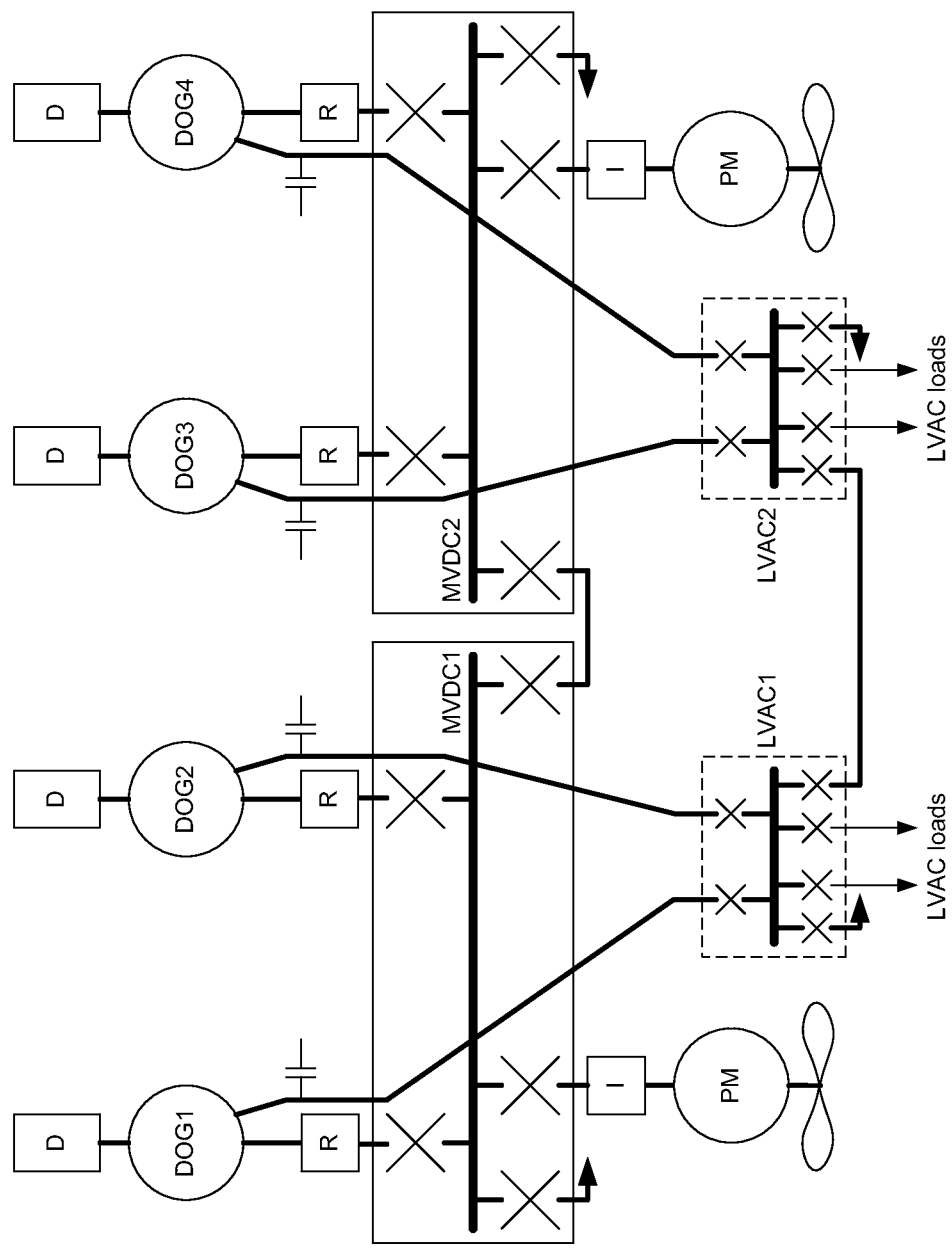
FIG. 6 is a schematic diagram of a marine power distribution and propulsion system in accordance with a second embodiment of the present invention with a dc distribution architecture.

FIG. 6 shows a second marine power distribution and propulsion system in accordance with the present invention. The system is identical to that shown in FIG. 2 apart from the fact that the first ac output provided by the first stator winding of each DOG is rectified by a multi-pulse rectifier R before being supplied to first and second medium voltage busbars MVDC1 and MVDC2. The medium voltage busbars MVDC1 and MVDC2 therefore represent a possible dc distribution architecture. By employing multi-pulse rectifiers R and by distributing dc power, the benefits of phase cancellation can be extended by allowing the first stator winding of each DOG to have any convenient number of phases without incurring the penalty of distributing ac power using an excessive number of phases.

In the arrangement of FIG. 6 the multi-pulse rectifiers replicate the rectifier function of each power converter PC shown in FIG. 2. The rectifiers R are preferably located in close physical proximity to each DOG. Since dc power is distributed through the first and second medium voltage busbars MVDC1 and MVDC2 only an inverter I needs to be used to interface the ac propulsion motors PM.

What is claimed is:

1. A power distribution system comprising:
a first and second distribution busbars;
a multi-pulse rectifier having terminals electrically connected to the first and second distribution busbars; and
a multiple output generator having ID first and second subsidiary stator windings associated with a first stator winding and (ii) a second stator winding having a second multi-phase ac output;
wherein the first subsidiary stator winding provides a first phase group of a first multi-phase ac output with n phases, the first phase group being connected to the first distribution busbar;
wherein the second subsidiary stator winding provides a second phase group of the first multi-phase ac output with n phases, the second phase group being connected to the second distribution busbar; and
wherein the n phases of the first multi-phase ac output are symmetrically phase shifted relative to the multi-phases of the second ac output.

2. The power distribution system of claim 1, wherein the first phase group of the n phases of the first multi-phase ac output is phase shifted by a predetermined positive angle relative to the n phases of the second ac output and the second phase group of the n phases of the first ac output is phase shifted by a predetermined negative angle relative to the multi-phases of the second ac output.

3. The power distribution system of claim 2, wherein the predetermined positive angle and the predetermined negative angle have substantially the same magnitude.

4. The power distribution system of claim 1, wherein the first ac output is a six-phase ac output and the second ac output is a three-phase output.

5. The power distribution system of claim 4, wherein the multi-pulse rectifier is a 12-pulse rectifier.

6. The power distribution system of claim 1, wherein three phases of the first ac output are phase shifted by a predetermined positive angle relative to the second ac output and three phases of the first ac output are phase shifted by a predetermined negative angle relative to the second ac output.

7. The power distribution system of claim 6, wherein the predetermined positive angle is about +15 degrees and the predetermined negative angle is about −15 degrees.

8. The power distribution system of claim 1, wherein the first ac output is a twelve-phase ac output and the second ac output is a three-phase ac output.

9. The power distribution system of claim 8, wherein three phases of the first ac output are phase shifted by a first predetermined positive angle relative to the second ac output, three phases of the first output are phase shifted by a second predetermined positive angle relative of the second ac output, three phases of the first ac output are phase shifted by a first predetermined negative angle relative to the second ac output, and three phases of the first ac output are phase shifted by a second predetermined negative angle relative to the second ac output.

10. The power distribution system of claim 9, wherein the first predetermined positive angle is about +22.5 degrees, the second predetermined angle is about +7.5 degrees, the first predetermined negative angle is about −7.5 degrees, and the second predetermined negative angle is about −22.5 degrees.

11. The power distribution system of claim 8, wherein the multi-pulse is a 24-pulse rectifier.

12. The power distribution system of claim 1, further comprising a capacitor bank connected to the second ac output.

13. The power distribution system of claim 1, wherein the first distribution busbar carries an ac distribution voltage.

14. The power distribution system of claim 13, wherein the multi-pulse rectifier is electrically connected between the first distribution busbar and an electrical load.

15. The power distribution system of claim 1, wherein the first distribution busbar carries a dc distribution voltage and the multi-pulse rectifier is electrically connected between the first stator winding and the first distribution busbar to rectify the first ac output.

* * * * *